United States Patent [19]

Janson

[11] 4,327,301
[45] Apr. 27, 1982

[54] MAGNETIC CLUTCH HOUSING

[75] Inventor: Gunnar H. Janson, Dudley, Mass.

[73] Assignee: Dana Corporation, Toledo, Ohio

[21] Appl. No.: 149,062

[22] Filed: May 12, 1980

[51] Int. Cl.³ .......................................... H02K 49/10
[52] U.S. Cl. ..................................... 310/104; 242/68.3
[58] Field of Search ................ 310/103, 104; 242/68.3

[56] References Cited

U.S. PATENT DOCUMENTS

| | | | |
|---|---|---|---|
| 2,684,210 | 7/1954 | Conti | 242/55 |
| 2,831,642 | 4/1958 | Michatek | 242/68.3 |
| 3,347,485 | 10/1967 | Bundschuh | 242/68.3 |
| 3,359,020 | 12/1967 | O'Donnell | 242/68.3 |
| 3,482,794 | 12/1969 | Beardsley | 242/68.3 |
| 3,620,468 | 11/1971 | St. Amour | 242/68.3 |
| 3,822,390 | 7/1974 | Janson | 310/104 |

Primary Examiner—Donovan F. Duggan
Attorney, Agent, or Firm—Frank B. McDonald

[57] ABSTRACT

A rotatable housing for a magnetic clutch contains a circumferential mounting portion thereon for receiving a rotary member, as, for example, a spool of recording tape. The mounting portion defines a surface therearound which contains detents for axially locating the rotary member on the latter surface. In a preferred embodiment, the detents are arranged in clusters about the circumference of the mounting surface, each cluster including at least two detents axially spaced, each detent defining a circumferentially extending protuberance on the mounting surface. In an alternate preferred embodiment, the mounting surface also includes a drive tang for limiting movement of the rotary member to one direction only, the drive tang defining an axially extending protuberance on the mounting surface.

6 Claims, 9 Drawing Figures

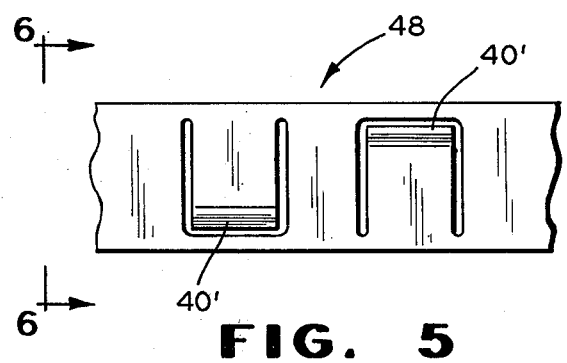
FIG. 5
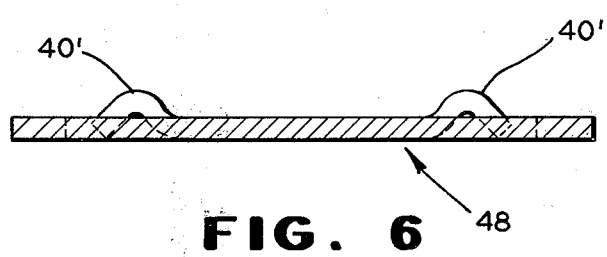
FIG. 6
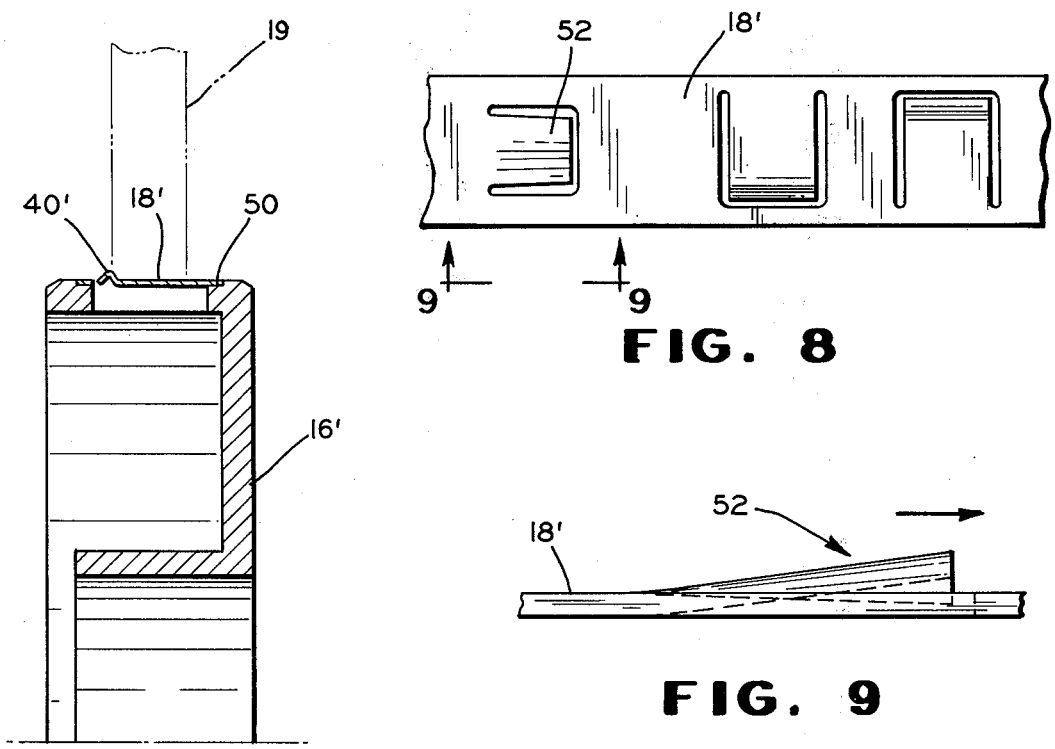
FIG. 7
FIG. 8
FIG. 9

MAGNETIC CLUTCH HOUSING

BACKGROUND

This invention relates to magnetic clutches for use in wind-up operations involving spools of strands as, for example, recording tape. More particularly, this invention relates to means for axially locating such wind-up spools on magnetic clutches for flexibility and convenience of operation, particularly with respect to changes of tape spools on winding arbors.

In the prior art, use of adjustable torque magnetic clutches for control of tension in tape strands has required routine removal of the clutches from winding arbors for change of spools thereon. Removal and replacement of the clutches is a time consuming and laborious task, as a great number of such clutches may be positioned and turned in parallel on a single arbor. Thus, in a typical case where magnetic clutches are used to control tape tension, routine winding operations involve a large plurality of tape spools. Present practice calls for (1) removal of all clutches from the tape winding arbor (perhaps as many as forty in number), (2) removal of each spool of tape individually from each clutch, and (3) reloading of new spools on individual clutches for the next in a sequence of such winding operations. Because each spool is located adjacent a fixed flange on each clutch, the removal of each clutch from the arbor is required for each change of the spools.

SUMMARY OF THE INVENTION

The invention disclosed and claimed herein provides a vehicle whereby the aforesaid removal and replacement of clutches from the tape winding arbor is avoided. The clutch housings contain no typical flanges for location of tape spools. Instead, each clutch housing incorporates a system of detents positioned about its circumference to define a mounting surface adapted for holding the spools. In a preferred embodiment of the housing, the detents are arranged in clusters about the periphery of the housing, each cluster containing at least two detents axially spaced for engagement of respective sides of a tape spool positioned on the mounting surface. The detents define circumferentially extending protuberances located on resilient cantilevered axially extending arms, which are integral with the housing.

BRIEF DESCRIPTION OF THE DRAWINGS

FIG. 5 is a fragmentary radial view of an alternate detent cluster formed on an annular metal spring band;

FIG. 6 is a fragmentary tangential profile view along 6—6 of FIG. 5 of the alternate detent cluster employed therein;

FIG. 7 is a sectional view of a clutch housing which incorporates the metal spring back of FIG. 5;

FIG. 8 is a fragmentary view of a drive tang incorporated in the annular metal spring band of FIG. 5; and FIG. 9 is a view of the drive tang along lines 9—9 of FIG. 8.

DETAILED DESCRIPTION OF PREFERRED EMBODIMENTS

Figure 1:
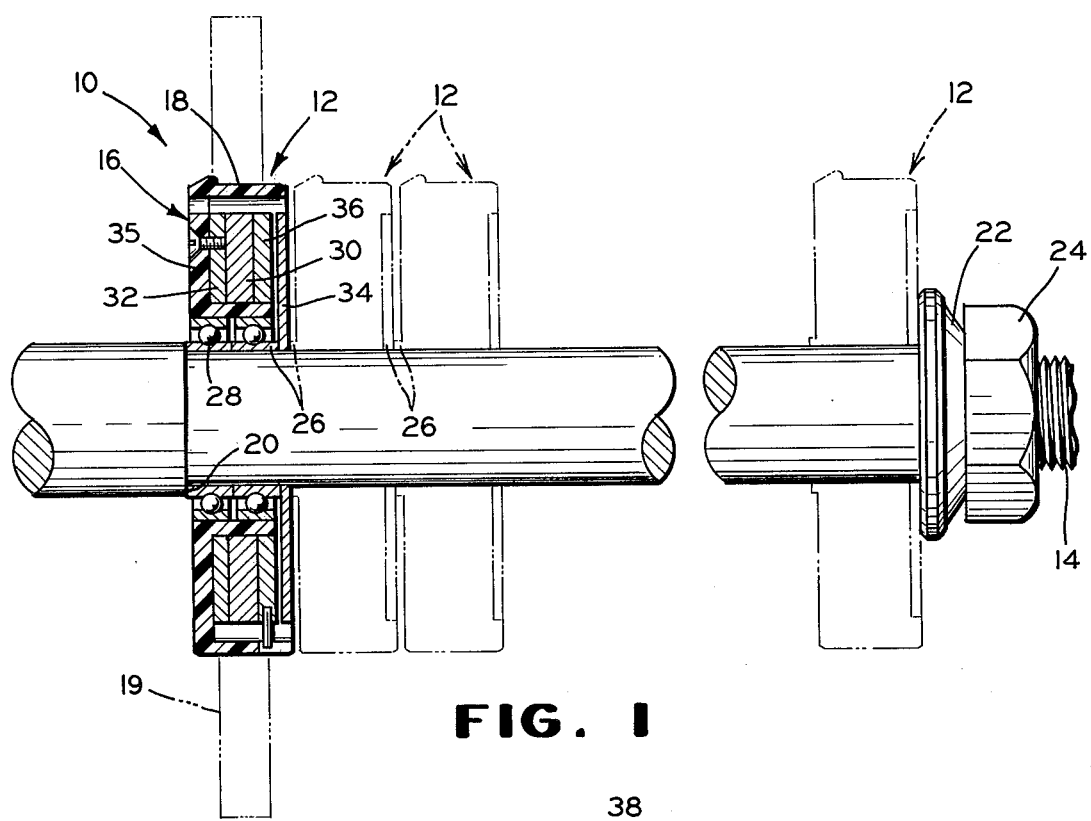
FIG. 1 depicts a preferred embodiment of the magnetic clutch housing of this invention as used in a plurality of magnetic clutches on a winding arbor for tape tension control, one clutch being shown in section, the remainder in phantom.

A preferred embodiment of the magnetic clutch housing of this invention is employed in the magnetic clutch apparatus 10 shown in FIG. 1. The apparatus 10 comprises a system of magnetic clutches 12 on a winding arbor 14. As depicted, only the left-most clutch 12 is shown in detail, the remainder being shown only in phantom. The winding arbor 14 is a driven member on which the magnetic clutches are mounted for rotation in parallel. Each clutch 12 contains a housing 16 having an external circumferential mounting surface 18, on which a spool 19 (shown in phantom) is mounted. The plurality of clutches 12 are sandwiched together on the arbor 14, between a shoulder 20 on one end thereof, and a Belleville washer and nut, 22 and 24, respectively, on the other. The clutches 12 are free to turn individually on the arbor, as inner bearing races 26 of each clutch abut one another to provide clearances between the rotatable body portions of the clutches 12. Such an arrangement of magnetic clutches on a winding arbor is suitable for control of tension in spools of tape which may be mounted individually thereon. In this described embodiment, the magnetic clutches produce an adjustable torque for control of tension in the strands of tape being wound on the spools. Clutch adjustment will be dictated by the tensions desired, which vary with the characteristics of the materials being wound. In addition, alternate embodiments involving fixed winding arbors 14 would be suitable for use with this invention. Thus, the clutches 12 would be turned so as to unwind the tape in response to tensile forces imposed on the strands, whereby the clutches would produce an adjustable drag for resisting unwinding rotation, as desired. In the embodiment of FIG. 1, however, a hysteresis clutch is shown and will be described. Alternatively, other types of clutches may be suitable in the practice of this invention, as, for example, eddy current clutches, as will be appreciated by those persons skilled in the design and use of adjustable torque magnetic clutches.

Referring now to the detail of the left-most magnetic clutch 12 as depicted in FIG. 1, the clutch housing 16 rotates on ball bearings 28 about the arbor 14. The housing 16 contains a multipole permanent magnet 30 fixed to a rotating circuit disc 32, the disc being fixed to a radial wall 35 of the housing 16. The disc 32 and multipole magnet 30 rotate on the bearing 28 relative to a hysteresis disc 34 fixed to the non-rotatable inner bearing race 26, the magnet 30 being interposed between the two discs as shown. The discs create flux paths between pole sectors of the magnet 30, whereby a magnetically induced drag tends to resist relative rotation of the discs. A flux gate 36 is mounted between the magnet 30 and the hysteresis disc 34, whereby magnetic torque may be adjusted by rotatably positioning the gate 36 relative to the magnet, as described and explained in U.S. Pat. No. 3,822,390.

Figure 2:
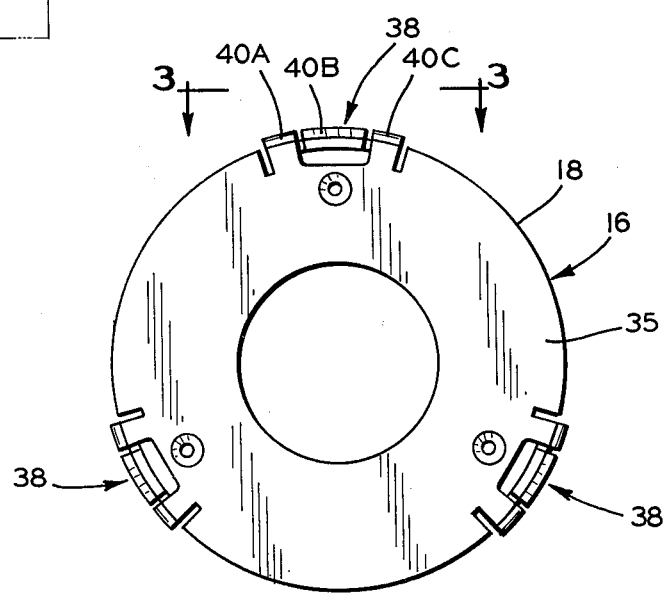
FIG. 2 is a side view of the clutch housing of FIG. 1, showing three clusters of detents about the periphery thereof.
Figure 3:
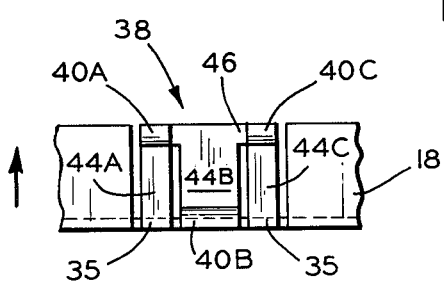
FIG. 3 is a fragmentary radial view along lines 3—3 of FIG. 2, which depicts one cluster of detents.
Figure 4:
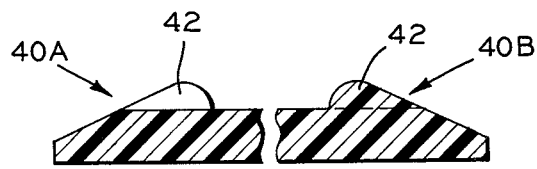
FIG. 4 is a fragmentary tangential profile view of the detents employed in the same preferred embodiment of the clutch housing.

A side view of the clutch housing 16 is shown in FIG. 2. As may be seen therein, three detent clusters 38 are circumferentially spaced about the external periphery of the housing 16 which defines the aforesaid mounting portion 18. Each cluster 38 contains three separate detents 40A, B, and C (FIG. 3), each detent 40 defining a circumferentially extending protuberance 42 (FIG. 4). There are at least two axially spaced detents in each cluster for engaging opposing sides of a tape spool 19 positioned on the mounting surface 18. In FIG. 3, two axially spaced detents are 40A and 40B. Although the latter detents 40 are slightly angularly offset, they are yet able to provide a positive positioning of a tape spool 19 on the mounting surface 18. The use of three clusters 38 about the circumference of the mounting surface 18, each cluster having at least two axially spaced, albeit angularly offset, detents 40 is designed to ensure a satisfactory securement of the spool 19 on the mounting surface 18.

Referring to FIGS. 2 and 3, it will be seen that the detents 40 are each located on a free end of a cantilevered arm 44A, B, or C as shown. Two of the arms 44A and 44C extend in the axial same direction from the radial wall 35 (see arrow in FIG. 3) of the housing, while the third arm 44B lies intermediate the first two and extends oppositely thereof from a bridge 46 interconnecting the detents 40A and 40C. Thus, the detent 40B on the free end of cantilevered arm 44B lies axially opposite the interconnected detents 40A and 40C as shown.

The clutch housing 16 as described is preferably made of a material having a very high endurance life for withstanding many flexural cycles. A preferred embodiment of the clutch 16 including integral detent clusters 38 would be made of a resilient plastic such as polypropylene. Thus the cantilevered arms 44 may be subjected to multiple bending cycles without becoming brittle and breaking away from the body of the housing.

An alternate embodiment of the housing 16' as shown in FIGS. 5 through 7 would not require use of a resilient material, however. Thus in FIG. 5, an alternate detent system is formed in an annular metal spring band 48, preferably of a strip of spring steel with resilient detents 40' stamped therein. The stamped band 48 is then inserted into a groove 50 in the housing 16' (FIG. 7) to form the tape spool mounting surface 18'. A tangentially oriented profile view of the detents 40' of the latter described embodiment is shown in FIG. 6.

A resilient drive tang may be added to the mounting surface 18 or 18' of either described embodiment, respectively. In FIGS. 8 and 9, the drive tang 52 is shown added to the latter-described embodiment, which incorporates the tang as a part of the spring steel stamping. The tang engages a rotary member, e.g. spool of tape 19, mounted on the mounting surface 18' of the housing 16' (FIG. 7). The tang defines an axially extending protuberance on the mounting surface 18', which operates to restrict relative movement of a rotary member, e.g. a tape spool on the mounting surface to only one direction of rotation (in the direction of the arrow in FIG. 9). This feature provides a one-way clutch, which, upon a momentary drop or reduction of tensile forces on the tape strand, will prevent a spool 19 from rotating against its intended direction. Thus, the tang 52 is disposed for frictionally locking against the internal hub of the spool upon any rotation thereof in the opposite direction (against the direction of the arrow).

As will be appreciated from the foregoing description, a system of detents 40 provided on the clutch housing 16 in accordance with this invention will provide for mass removal of tape spools from the clutch apparatus 10 without requirement of removal of individual clutches from the arbor 14. Thus, referring to FIG. 1, after removal of the Belleville washer 22 and nut 24, an automatic spool removal apparatus may conveniently be employed to exert a force to the right (FIG. 1) against the tape spool on the left-most clutch shown. Axial pressures on the detents 40 then produced by the spool hubs will cause the cantilevered arms 44 to bend radially inwardly, thus allowing successive spools to slide over successive clutch housings 16 for removal. Means may aso be employed for automatic mass replacement of new tape spools on the clutches as well, as will be appreciated by those persons skilled in the art.

What is claimed is:

1. In a housing for a magnetic clutch, said housing defining a circumferential surface thereon for mounting a rotary member, an improvement in said housing comprising a plurality of detents in said mounting surface for axially locating said rotary member on said surface, said detents positioned in clusters, said clusters being circumferentially spaced about said mounting surface, wherein each of said clusters contains at least two axially spaced detents, each detent defining a circumferentially extending protuberance on said mounting surface, each of said detents comprising an integral portion of said mounting surface, each detent defining one end of a plurality of spaced, adjacent, axially extending cantilevered arms, at least two of said arms being joined to radially extending wall portions of said housing, wherein a third arm extends inversely, intermediately and parallel to aforesaid arms from a bridge, said bridge defining an interconnection between the detents of aforesaid arms.

2. The housing of claim 1 wherein said mounting surface further comprises a resilient drive tang disposed for engagement of said rotary member, whereby relative rotation of said rotary member with respect to said surface is limited to one degree of freedom.

3. The housing of claim 2 wherein said drive tang is integral with said mounting surface and defines an axially extending protuberance on said mounting surface.

4. In a magnetic clutch including a housing, said housing having a periphery for mounting a member, an improvement comprising a plurality of detents in said periphery for axially locating said member on said surface, said detents positioned in clusters, said clusters being circumferentially spaced about said mounting surface, each of said clusters containing at least two axially spaced detents, each detent defining a circumferentially extending protuberance on said mounting surface, each of said detents comprising an integral portion of said mounting surface, each detent defining one end of a plurality of spaced, adjacent, axially extending cantilevered arms, at least two of said arms being joined to radially extending wall portions of said housing, wherein a third arm extends inversely, intermediately and parallel to aforesaid arms from a bridge, said bridge defining an interconnection between the detents of aforesaid arms.

5. The clutch of claim 4 wherein said mounting surface further comprises a resilient drive tang disposed for engaging said rotary member whereby relative rotation of said member with respect to said surface is limited to one degree of freedom.

6. The clutch of claim 5 wherein said drive tang is integral with said mounting surface, and defines an axially extending protuberance on said mounting surface.

* * * * *